United States Patent Office 3,224,417
Patented Dec. 21, 1965

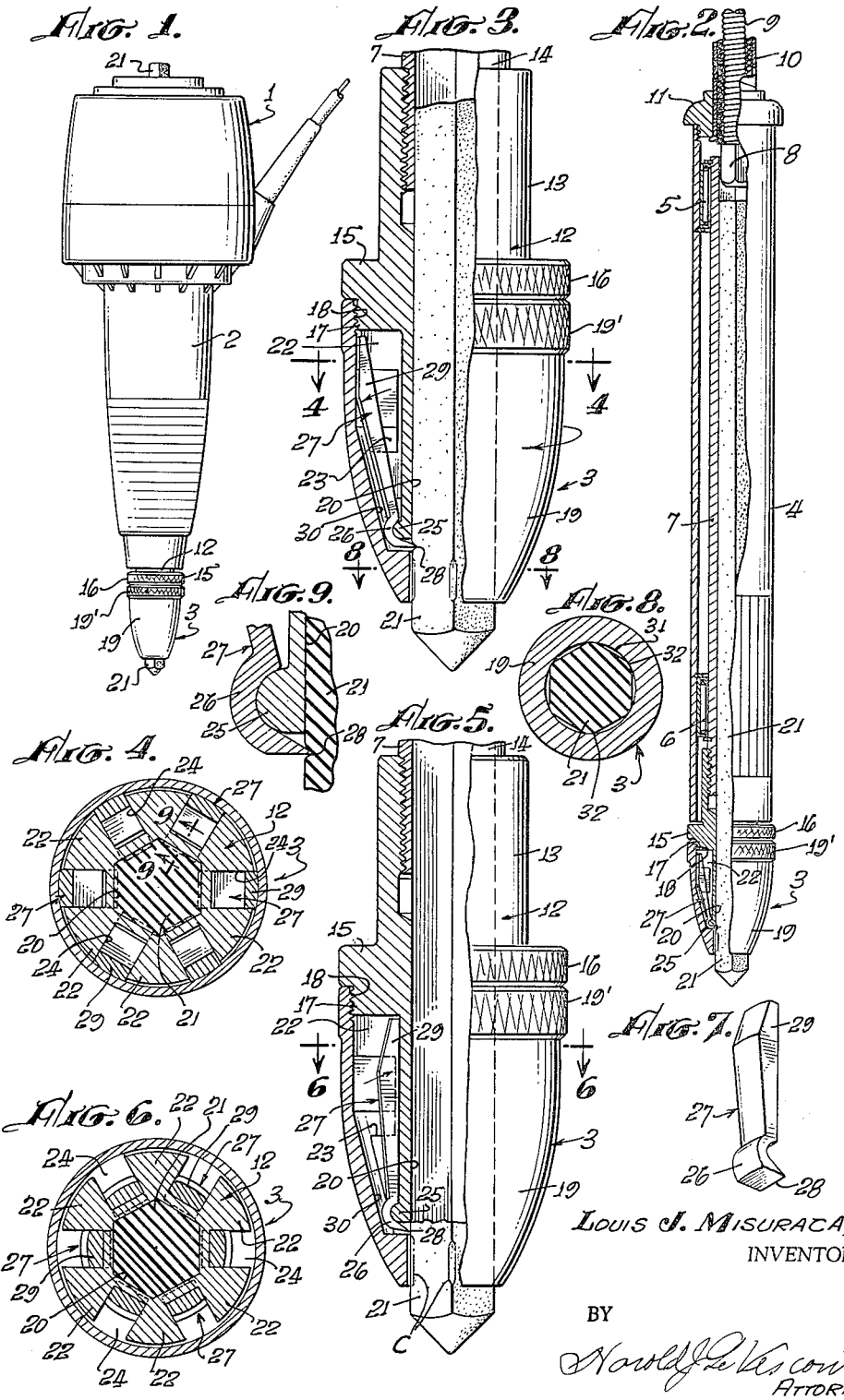

3,224,417
ERASER-HOLDING CHUCK AND ERASER
Louis J. Misuraca, 1359 Romulus Drive, Glendale, Calif.
Continuation of application Ser. No. 365,027, May 5, 1964. This application June 1, 1965, Ser. No. 467,804
2 Claims. (Cl. 120—36)

This application is a continuation of my earlier application, Serial No. 365,027, filed May 5, 1964, which was a continuation-in-part of my prior application, Serial No. 253,324, filed January 23, 1963, both applications now abandoned.

The present invention relates to motor driven erasing machines and more particularly to an improved combination of driving and holding chuck means cooperating with a novel form of eraser.

The principal object of the invention is to provide an eraser holding chuck and eraser in which the means for holding or gripping the eraser during use is separate from and/or independent of the means for imparting rotation to the eraser.

Another object of the invention is to provide an eraser holding chuck means effective to grip the eraser against endwise movement only while the chuck is being rotated, resultantly allowing the eraser to be moved longitudinally in the chuck at all times when the chuck is not being rotated.

Still another object of the invention is to provide in a rotary erasing machine a holding chuck means effective to grip the eraser only while the chuck is rotating the eraser and in which at all other times, the resilience of the eraser element is one of the means by which the chuck is caused to be disengaged from the eraser.

With the foregoing objects in view, together with such additional objects and advantages as may subsequently appear, the invention resides in the parts, and in the construction, combination and arrangement of parts described, by way of example, in the following specification of certain presently preferred embodiments of the invention, reference being had to the accompanying drawings which form a part of said specification and in which drawings:

FIG. 1 is a side elevational view of a motor driven erasing machine embodying the chuck and eraser of the present invention, FIG. 2 is a side elevational view, partly in section, of another form of motor driven eraser machine embodying the same novel chuck and eraser of the present invention, the interior portion of the chuck shown in section showing the relation of the parts as they exist during rotation of the chuck, FIG. 3 is a greatly enlarged view, partly in medial section of the chuck of the present invention together with a portion of the eraser held thereby showing the conditions prevailing when the chuck is being rotate, FIG. 4 is a transverse section taken on the line 4—4 of FIG. 3, FIG. 5 is a view similar to FIG. 3 but showing the relative positions of the parts within the chuck when the chuck is not being rotated, FIG. 6 is a transverse section on the line of 6—6 of FIG. 5 which is comparable to section 4—4 with the parts in the positions shown in FIG. 5, FIG. 7 is a perspective view of one of the eraser gripping fingers or jaws of the invention, FIG. 8 is a greatly enlarged fragmentary sectional view taken on the line 8—8 of FIG. 3 showing the nature of the engagement of the mouth of the chuck with an eraser, and FIG. 9 is a greatly enlarged, fragmentary section taken on the line 9—9 of FIG. 4 showing the nature of the engagement of a chuck jaw with the side of an eraser.

Referring first to FIGS. 1 and 2, FIG. 1 shows an erasing machine generally like that shown in my Patent No. 3,070,379 dated December 25, 1962 and generally including a motor 1 mounted on one end of an elongated body structure 2 which is adapted to be held in the hand of the user and affording bearing support for a motor driven hollow shaft within said body structure which at the end thereof remote from the motor carries an eraser chuck 3 embodying the present invention, while in FIG. 2 there is shown another embodiment of driving means for the chuck 3 comprising an elongated sleeve 4 adapted to be held in the hand of a user and affording bearing support by means of bearings 5 and 6 for a hollow shaft 7 of which the interior is preferably of polygonal cross section complementary to the cross section of the eraser to be contained therein. At one end, the shaft 7 carries the chuck 3 of the present invention and at its other end the polygonal interior thereof is engaged by a complementary polygonal driving stud 8 carried by one end of a flexible shaft 9 housed within an equally flexible sheath 10 having the corresponding end thereof threadedly attached to the end of the sleeve 4 by a cap element 11. The flexible shaft may be driven by any suitable means as, for example, by the motor of an electric typewriter and, since the nature of the source of power is not essential to the present invention, the showing of a driving means for the flexible shaft has been omitted.

Referring now principally to FIGS. 3-9, the chuck 3 includes a body member 12 having a hollow, cylindrical, internally threaded shank portion 13 for mounting the chuck on a corresponding threaded end of a hollow driving shaft 14 of either of the two forms of driving means shown in FIGS. 1 and 2. For convenience in description, the various parts of the chuck and eraser will at times be described as being above, below, etc. having reference only to FIGS. 1, 2, 3 and 5 of the drawings, it being recognized that in use the device may occupy any position or attitude in which the user may desire to employ it.

Below the shank portion 13, the body portion increases in diameter to form a head 15 having a narrow knurled gripping surface 16 and an exteriorly threaded portion 17 adjacent thereto with which the threaded upper end 18 of the chuck cap 19 is detachably engaged, said upper end of the chuck cap having a corresponding knurled peripheral portion 19′.

The chuck body 12 is provided with an axial opening 20 extending therethrough, said opening being non-circular peripherally and fitting the complementary configuration of the resilient eraser 21 sufficiently closely so that upon rotation of the chuck by the power means to which it is connected, the eraser will be rotated with it without resort to clamping means as required with prior art circular erasers and driving means for the chucks in which such prior art circular erases were used. At the same time, the fit is sufficiently loose to permit the eraser 21 to be readily moved endwise therein without difficulty. In the illustrated embodiment, a hexagonal configuration has been chosen, but it will be realized, as the description progresses, that any non-circular configuration may be employed. The erasers are formed of elongated pieces of rubber compounds of varying degrees of hardness and abrasive qualities but are always somewhat resilient.

The exterior surface of the chuck body 12 at the side of the head remote from the shank 13 is provided with a first set of radially extending bosses 22 adjacent the head 15 and a second set of radially extending bosses 23 adjacent the distal end of the chucks; said sets of bosses having straight sides extending generally parallel to the axial line of the chuck and defining guideways 24. In the illustrated embodiment of the invention, these bosses define as many guideways as there are sides to the eraser and said guideways are radially opposite the sides of the polygonal opening 20 extending through the chuck body.

Each of said guideways terminates in a transverse rounded shoulder 25 at the end of the chuck body and mounted on said shoulder for pivotal movement thereon is the curved portion 26 of a jaw or finger element 27 received in the guideway associated with the shoulder engaged by the jaw. Each jaw has a sharp end 28 overlying the distal end of the chuck body with capacity to move radially inwardly into the surface of an eraser 21 held in the chuck body opening 20 or to move out of contact with the eraser as shown in FIGS. 5 and 6. Each jaw element 27, further, is provided with a weighted end 29 extending from the shoulder 25 in one each of the guideways 24 into close adjacency to the head portion 15. The chuck cap element 19 is provided with an inner surface portion 30 which is closely adjacent to the outer curved surface of the curved portion 26 of the jaw whereby the jaw is held on the shoulder 25 but with sufficient clearance to pivot freely on said shoulder 25.

Under the influence of normal speed of rotation imparted to the chuck and eraser, centrifugal force will cause the weighted ends 29 of the jaws to swing outwardly into contact with the inner face of the chuck cap element 19 as shown in FIGS. 2, 3 and 4 with incident inward movement of the pointed ends 28 of the jaws into the surface of the eraser indenting the sides of the eraser as shown in FIGS. 3, 4 and 9 and thus holding the eraser against being pushed back into the chuck by pressure of the eraser on the surface being erased. When rotation ceases, the resilience of the eraser causes the jaw elements to assume the disengaged positions shown in FIGS. 5 and 6 and the eraser is thus automatically free to be adjusted in the chuck or to be removed and replaced by another eraser element of the same or different grade as may be desired. Consequently, unlike prior art devices, in the present invention there is interaction between the eraser and the gripping means effective to release the eraser for adjustment, removal or replacement without resort to any eraser clamping means which must first be released, the adjustment or replacement of the eraser accomplished and again tightented to grip the adjusted or replaced eraser.

In my prior Patent No. 3,070,379, there is disclosed inter alia a spring pressed ball which is adapted to prevent inadvertent or unintentional removal or loss of the eraser during any period when the device is not being operated.

The means for accomplishing this loss prevention constitutes the present improvement over my earlier patent.

However, it has been found from experience with this earlier design that for the eraser to be usable for the purpose intended and for the spring pressed ball eraser-retaining means to function properly, the eraser must have a length exceeding about one and one-half inches. Otherwise, once the eraser is of any shorter length and can no longer be retained by the spring pressed ball, it will be useless and, consequently, fall from the chuck and become lost as soon as the device has stopped operation and the gripping jaws means 28 are retracted from their contact with the eraser.

This application is directed to a more simplified means for retaining a relatively short length of eraser within an orifice of a chuck, which, while of reduced length, may be grasped by the jaw means and will also apply uniform radially inwardly directed compressive forces to predetermined areas of the eraser, which was not possible in view of the teaching in my earlier device.

In this new construction it is contemplated that the cap 19 include a circular orifice or mouth portion 31 which has a slightly smaller diameter than the major diameter of the intersecting ridged areas of the non-circular eraser, so that the circular orifice 31 will grip the intersecting ridged area of any two flat faces irrespective of whether the eraser comprises a triangular, square, hexagonal or other non-circular configuration. By further reference at this time to and as best shown in the cut-away view of the chuck 19 in FIG. 5, the orifice 31, being of a smaller diameter, applies radially inwardly directed compressive forces upon the intersecting ridges of the flat faces of the eraser 21 (note dot-dash lines at C), thereby preventing the eraser from slipping from the chuck even after it is no longer engageable by the jaws 26. It also will be apparent that since the interior of the circular orifice 31 is capable of retaining the eraser, as indicated above, it will, as a consequence, have continued utility even after its length is reduced so as not to be engageable by the jaws 28.

Furthermore, it will be appreciated that the radially inwardly directed compressive forces referred to above have reactive force components since, for example, in an eraser of hexagonal configuration, the resultant compressive forces each intersect on the longitudinal axis and are in opposition to one another.

While in the foregoing specification there has been disclosed certain presently preferred embodiments of the invention, it is not to be inferred therefrom that the invention is limited to the precise details of construction thus disclosed by way of example and it will be understood that the invention includes as well all such changes and modifications in the parts and in the construction, combination and arrangement of parts as shall come within the purview of the appended claims.

I claim:

1. In a power actuated eraser means, an elongated, resilient, expendable eraser element of uniform, non-circular cross-sectional configuration and a power operated chuck device in which said eraser element is held and by which said eraser element is rotated; said chuck device having an eraser receiving portion of non-circular configuration complementary to the said cross-sectional configuration of said eraser element, and further having positioned in longitudinally spaced relation thereto means defining a circular orifice portion the inner circumference of which is smaller than the longitudinally aligned non-circular portion of said chuck and adapted to apply radially inwardly directed compressive forces the resultant components of which intersect on a line extending longitudinally of said eraser element, and centrifugal force responsive means carried by said chuck device and including radially inwardly directed jaw means interposed between said eraser receiving portion of non-circular configuration and the means defining the circular orifice portion, effective upon rotation of said chuck device at operating speed to overcome the resilience of said eraser element upon cessation of rotation of said chuck device and to disengage said centrifugal force responsive means, the compressive forces applied by the circular orifice portions acting to restrain the eraser from longitudinal movement throughout the entire length of the chuck thereby preventing the eraser from dropping out of said chuck device.

2. An eraser means as claimed in claim 1, wherein the non-circular portion of said chuck device is of polygonal configuration.

References Cited by the Examiner

UNITED STATES PATENTS

| | | | |
|---|---|---|---|
| 1,916,199 | 7/1933 | Back | 120—9 |
| 3,070,379 | 12/1962 | Misuraca | 120—36 X |

EUGENE R. CAPOZIO, *Primary Examiner.*

LAWRENCE CHARLES, *Examiner.*